(12) United States Patent
Lippold et al.

(10) Patent No.: US 6,183,143 B1
(45) Date of Patent: Feb. 6, 2001

(54) PHOTOSENSITIVE MEDIUM CASSETTE AND METHOD OF USE

(75) Inventors: Steven R. Lippold, Oakfield; Steven F. Entz, Albion; Alex B. Vayntrub, Rochester, all of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/181,314

(22) Filed: Oct. 28, 1998

(51) Int. Cl.$^7$ ................................................. G03B 17/26
(52) U.S. Cl. ............................ 396/512; 396/514; 242/348
(58) Field of Search .................................. 396/511, 512, 396/514, 515; 355/72; 242/348, 348.4

(56) References Cited

U.S. PATENT DOCUMENTS

| | | |
|---|---|---|
| 2,298,339 | 10/1942 | Boes . |
| 3,544,039 | 12/1970 | Lynch . |
| 3,550,882 | 12/1970 | Craven . |
| 4,302,102 | 11/1981 | Stark et al. ............................... 75/72 |
| 5,222,681 | 6/1993 | Loewe et al. ...................... 242/348.4 |
| 5,310,049 | 5/1994 | Bigelow et al. . |
| 5,482,223 | 1/1996 | Bresina et al. .................... 242/348.4 |
| 5,659,833 | 8/1997 | FitzGerald ............................ 390/512 |
| 5,911,380 * | 6/1999 | Shiba .................................. 242/348 |

FOREIGN PATENT DOCUMENTS

| | | |
|---|---|---|
| 0 758 101 | 2/1997 | (EP) . |
| 4-320266 | 11/1992 | (JP) . |

* cited by examiner

*Primary Examiner*—David M. Gray
(74) *Attorney, Agent, or Firm*—David A. Novais

(57) ABSTRACT

A cassette and method of use, which cassette can receive and rotatably mount a roll of photosensitive medium web. The cassette includes a housing having a first section and a second section with respective, mating margins extending in a transverse direction between opposite ends of the cassette. The second section is movable with respect to the first section between a closed position in which the mating margins abut one another so that the housing is maintained light tight, and an open position in which the margins are spaced apart. The margins can define between them a slit through which the web of photosensitive medium can pass. The cassette further has a lock assembly with at least one lock member movable between a locked position in which it restrains the second section from moving from the closed position, and a released position in which the cassette can be opened. The lock assembly further includes a handle adjacent a first end of the cassette connected to the at least one lock member so that the at least one lock member can be moved between the locked and released positions by manual movement of the handle.

16 Claims, 6 Drawing Sheets

PHOTOSENSITIVE MEDIUM CASSETTE AND METHOD OF USE

FIELD OF THE INVENTION

This invention relates to holding different lengths photographic web rolls in particular, for rotation.

BACKGROUND OF THE INVENTION

In photofinishing, customer images are printed onto a photographic paper. Conventionally this printing has been optical, using a print engine in the form of a light source which has passed through a negative to be printed, to expose the paper. More recently, it has been suggested that the exposure can be from a digitally captured image, using a print engine such as a CRT, laser or light emitting diode assembly. At wholesale photofinishing laboratories, where large numbers of images must be printed in a short time, the paper is normally supplied from a web in the form of a roll mounted within a paper dispensing cassette in a known manner. The paper cassette is light tight when closed for transport to and from the printer, and is typically loaded in a dark room to avoid undesirable fogging of the photographic paper. For convenience, the take-up cassette is of the same construction as the dispensing cassette. The only difference between the dispensing and take-up cassettes being that the dispensing cassette is pre-loaded with a roll of -photographic web mounted on an intercore, while the take-up cassette initially has an intercore which is empty. The intercores are dimensioned to fit on a motor driven rotating spindle within the printer. Rotation of the spindle can control dispensing and uptake of a paper roll. The web is exposed at a print engine in a path between the dispensing and take-up cassettes. Following exposure, the web is chemically developed in a known manner and then cut to yield paper prints of many individual images which are then supplied to respective customers.

Conventional cassettes usually have two sections, one of which swings or somehow moves with respect to the other, so as to provide a closed position which is light tight, and an open position in which a web roll mounted on an intercore can pass through the opening for mounting within the cassette. For example, one well known arrangement is the so-called "clam shell" configuration where essentially two semi-cylindrical sections are hinged at adjacent axially extending edges. Similar arrangements for film or paper canisters are disclosed, for example, in U.S. Pat. Nos. 5,482,223, U.S. Pat. Nos 5,659,833, U.S. Pat. Nos. 5,222, 681, and U.S. Pat. Nos. 4,302,102. In such configurations respective mating edges of the two sections swing between a closed position in which the mating edges are adjacent to define a slit, and an open position in which they are spaced apart to allow access to the interior of the cassette. Removable clamps may be provided which are spaced apart along the mating edges, to urge the edges together and retain the cassette closed, particularly during transportation. During loading of the dispensing cassette, a leading edge of the web can be left threaded through the slit of the closed cassette. This leading edge can be used to pull the web from the cassette and thread it past the print engine and onto an empty intercore on the take-up cassette. While the clamps provide sufficient force to prevent light leakage into the cassette, they do not provide so much force as would prevent the pulling of the web through the slit.

A conventional printer which might use such cassettes will typically have a housing with two upstanding end walls, and two opposed side walls extending between the end walls. One of the side walls will typically be provided with a side door through which dispensing and take-up cassettes are passed into the housing for loading and removal from the printer. Both the dispensing and take-up cassettes must be loaded into the printer through the same door (that is, from the same side of the printer). However, during attachment of the leading end onto the intercore within the take-up cassette it is necessary to fully open the take-up cassette to allow an operator to manually perform the attaching operation. If a pair of clamps have been left engaged on the take-up cassette, the present invention realizes that to unlock the clamps it is necessary for the operator to both unlock a clamp nearest the door side of the printer, and to reach through the printer toward the opposite side in order to unlock the other clamp. This can be difficult in the confines of the spaces available within typical printers. Furthermore, the present invention recognizes that in a typical printer it is often difficult for an operator to know the direction to web feed. Thus, after installing dispensing and take-up cassettes in such a printer, it is difficult for an operator to visually distinguish the dispensing and take-up cassettes since the cassettes themselves are identical in appearance. This may lead the operator to mistakenly disengage the clamps on the dispensing cassette and open it, in the mistaken belief that it is the take-up cassette. Such a situation would lead to premature exposure of the much of the web.

The present invention recognizes then, that it would be desirable to provide a simple cassette locking arrangement which locks the mating edges at multiple positions along their lengths, yet does not require an operator to manually reach substantially inside the printer and along the cassette. The present invention further recognizes that it would be desirable if some simple means could be provided which would aid an operator in correctly identifying and opening the take-up cassette when loaded in the machine.

SUMMARY OF THE INVENTION

The present invention then, provides a cassette which can receive and rotatably mount a roll of photosensitive medium web. The cassette includes a housing having a first section and a second section with respective, mating margins extending in a transverse direction between opposite ends of the cassette. The second section is movable with respect to the first section between a closed position in which the mating margins abut one another so that the housing is maintained light tight, and an open position in which the margins are spaced apart. The margins can define between them a slit through which the web of photosensitive medium can pass. The cassette further has a lock assembly with at least one lock member movable between a locked position in which it restrains the second section from moving from the closed position, and a released position in which the cassette can be opened. The lock assembly further includes a handle adjacent a first end of the cassette connected to the at least one lock member so that the at least one lock member can be moved between the locked and released positions by manual movement of the handle.

In one aspect of the invention, the lock assembly has at least two lock members disposed at different positions along the margins and each movable between a locked position in which it restrains the margins from moving from the closed position, and a released position. In this case a controller is provided which is connected between the handle and the at least two lock members so that the at least two lock members can be moved between locked and released positions by manual movement of the handle.

The present invention further provides a method of dispensing a photosensitive medium web, comprising dispensing the web through the slit of a cassette of the present invention, from a roll of photosensitive web material rotatably mounted within the cassette housing. In another aspect of the method of the present invention, there is also provided a method of taking up a photosensitive medium web, comprising receiving the web through the slit of a cassette of the present invention and winding it onto an intercore rotatably mounted within the cassette.

A still further aspect of the present invention provides a method of exposing a photosensitive medium web in a printer having a housing, a light emitting print engine within the housing, and having at least one access (for example, a door) which allows access to an interior of the housing through a first side of the printer housing. This method includes dispensing the web through the slit of a first cassette of the present invention, from a roll of photosensitive web material rotatably mounted within the cassette housing, wherein the first cassette is oriented such that its handle is on an end of the first cassette which is remote from the access to the printer housing. The web is fed past the print engine and at least a portion of the web is exposed at the print engine. The exposed web is received into a second cassette of the present invention, and wound onto an intercore rotatably mounted within the cassette, wherein the second cassette is oriented such that its handle is on an end of the second cassette which is closest to the access to the printer housing.

Cassettes of the present invention have a relatively simple locking arrangement which locks the mating edges at multiple positions along their lengths, yet does not require an operator to manually reach substantially inside a printer and along the cassette. Cassettes of the present invention further provide a simple means which aids an operator in correctly identifying and opening the take-up cassette. In particular, the same simple locking arrangement can serve as such a means.

BRIEF DESCRIPTION OF THE DRAWINGS

Embodiments of the invention will now be described with reference to the drawings, in which.

Where practical, the same reference numbers have been used to indicate like parts.

DETAILED DESCRIPTION OF THE INVENTION

Figure 1:
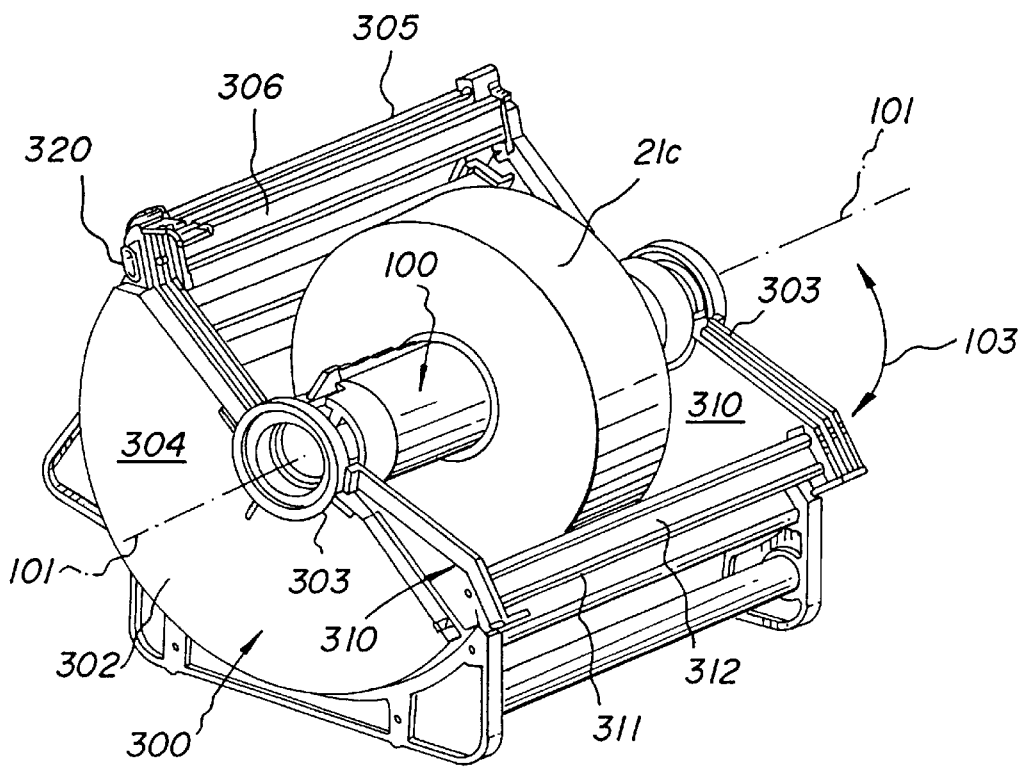
FIG. 1 is a perspective view, from the front, of a loaded cassette in the open position.
Figure 3:
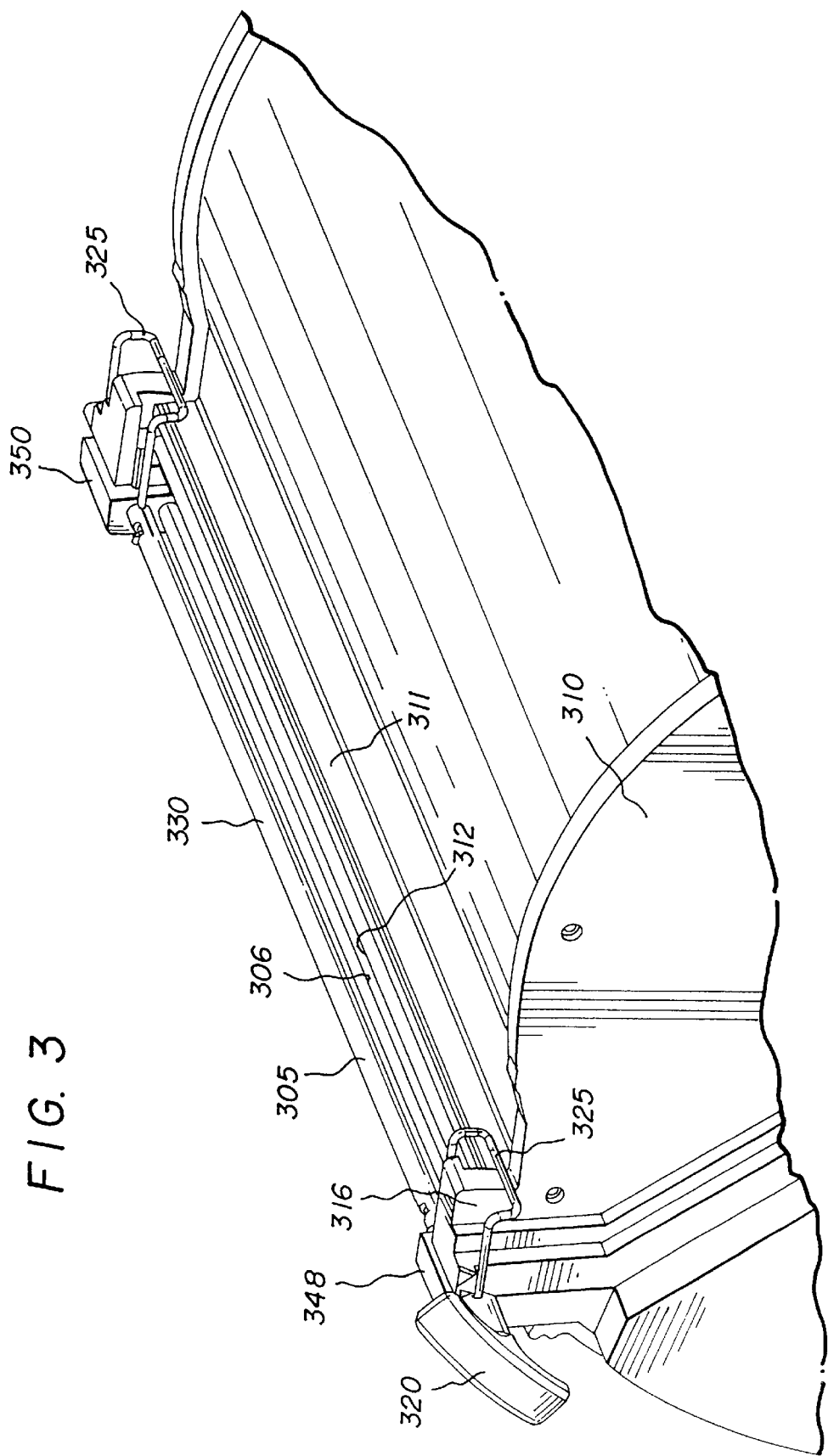
FIG. 3 is an enlarged perspective view of a portion of the cassette of FIG. 1 when in the closed position and with the locked members in the locked position.
Figure 4:
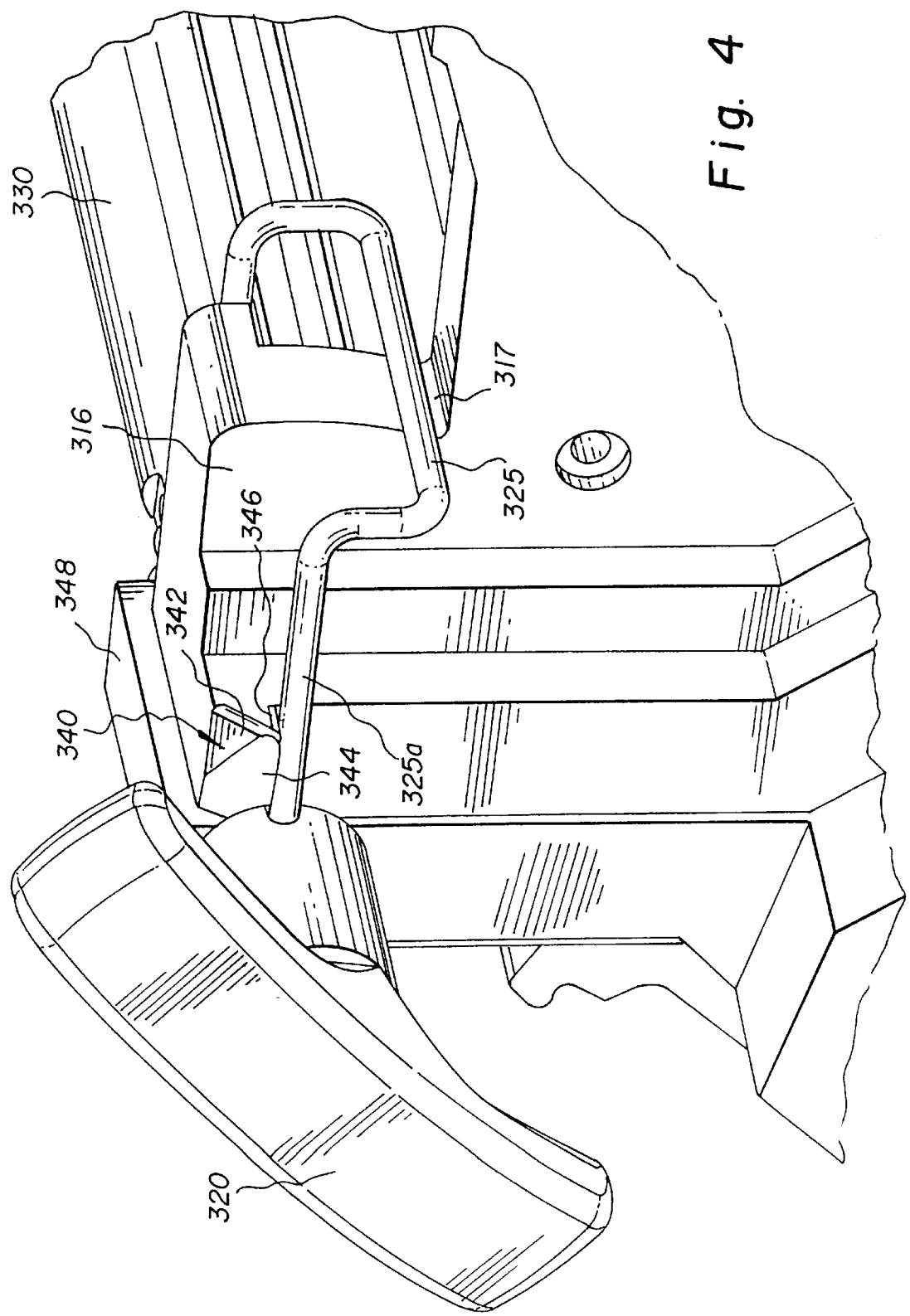
FIG. 4 is an enlarged view of a portion of FIG. 3.
Figure 7:
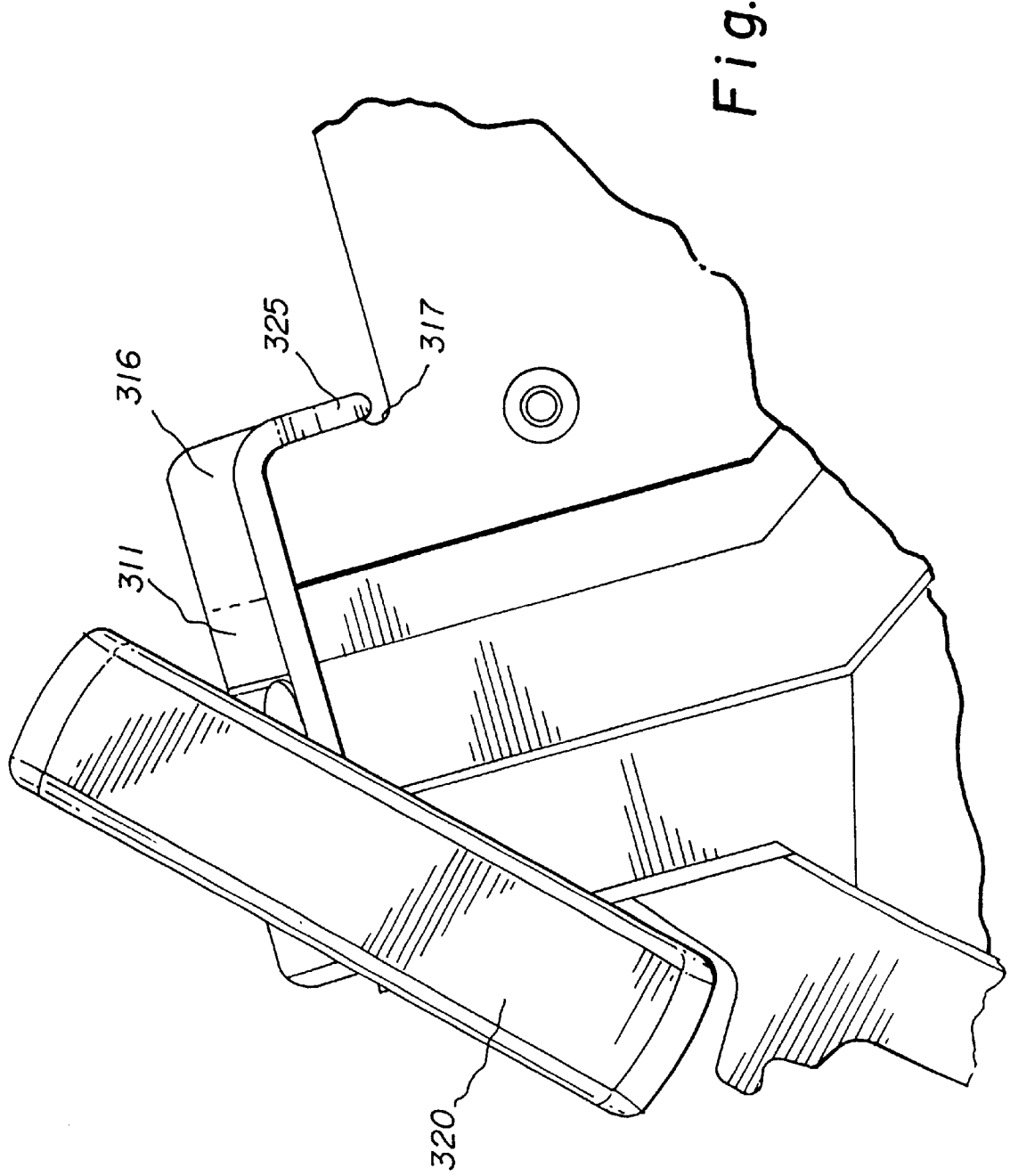
FIG. 7 is a view similar to FIG. 4 but from the side of the cassette.

Referring to the drawings, a cassette 300 of the present invention may be of various constructions, such as a clam shell construction as previously described. Preferably though, cassette 300 is of a construction with a first stationary, generally semi-cylindrical section 302, and a second rotating generally semi-cylindrical section 310. Second section 302 is coaxial about axis 101 with first section 310, and is rotatable about axis 101 (that is, in the direction of arrow 103) between an open position such as illustrated in FIG. 1, and a closed position as best seen in FIGS. 3, 4, and 7. Sections 302, 310 have mating margins 306, 312 carried by lips 305, 311, respectively. Margin 306 extends in a transverse direction between opposite ends 304 of first section 302 while margin 312 extends between opposite ends of second section 310. Each of margins 306, 312 is covered with a light sealing plush material, such as one or more layers of felt cloth or the like. When section 310 is in the closed position (defining a closed position of the cassette) margins 306, 312 flushly abut one another so that no substantial amount of light enters cassette 300 but a photosensitive web can still be drawn through a narrow slit resulting from yielding of the plush material. When section 310 is in the open position the gap between margins 306, 312 is sufficient to allow entry and exit of a roll of photographic web 21c previously mounted on an intercore 100. Web 21c may be photographic paper or transparent film, either of various widths. Generally semi-circular cut-outs of ends 304 which are co-axial about axis 101, define two opposed intercore mounts 303. Intercore mounts 303 receive ends of intercore 100 with the web roll 21c thereon, and allow intercore 100 and mounted roll 21c to rotate about axis 101. Rotation of second section 310 from the open to the closed positions traps the received ends of intercore 100 within mounts while rotation of second section 310 to the open position allows intercore 100 to be manually removed from mounts 303.

Cassette 300 may particularly be of the construction disclosed in U.S. patent application entitled "CASSETTE FOR PHOTOSENSITIVE MATERIAL", Ser. No. 09/014,803 filed by Entz on Jan. 28, 1998. The construction of intercore 100 and devices for mounting roll 21c on intercore 100, are described in detail in U.S. patent applications entitled "PAPER CORE LOCATOR", Ser. No. 09/070,343, filed by Lippold et al on Apr. 30, 1998, and entitled "PAPER ROLL DRIVE", Ser. No. 09/070,212, filed by Lippold on Apr. 30, 1998. Those references and all other references cited here, are incorporated in this application by reference.

Figure 5:
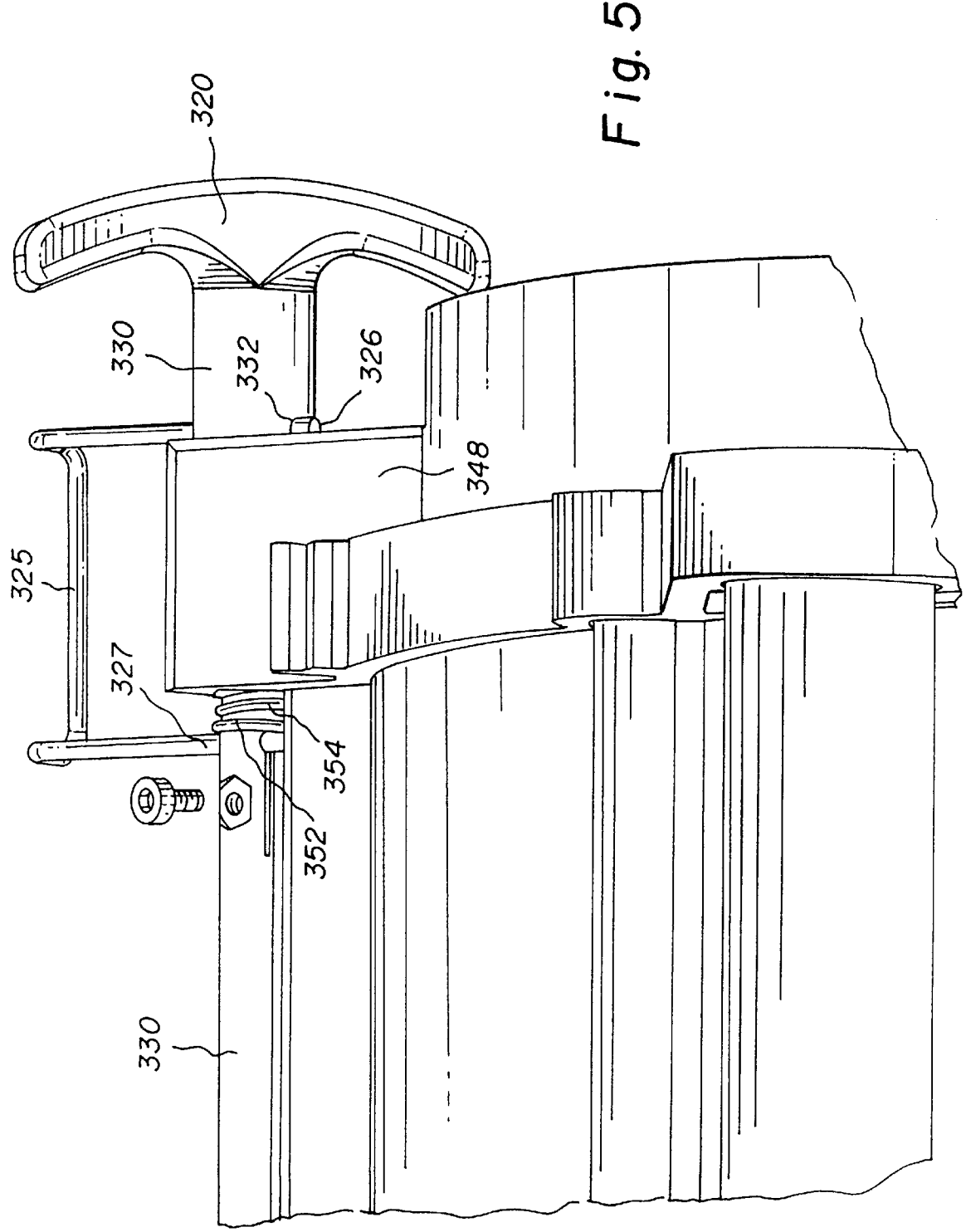
FIG. 5 is a rear perspective view of the portion of FIG. 3 but showing the lock members in the released position.
Figure 6:
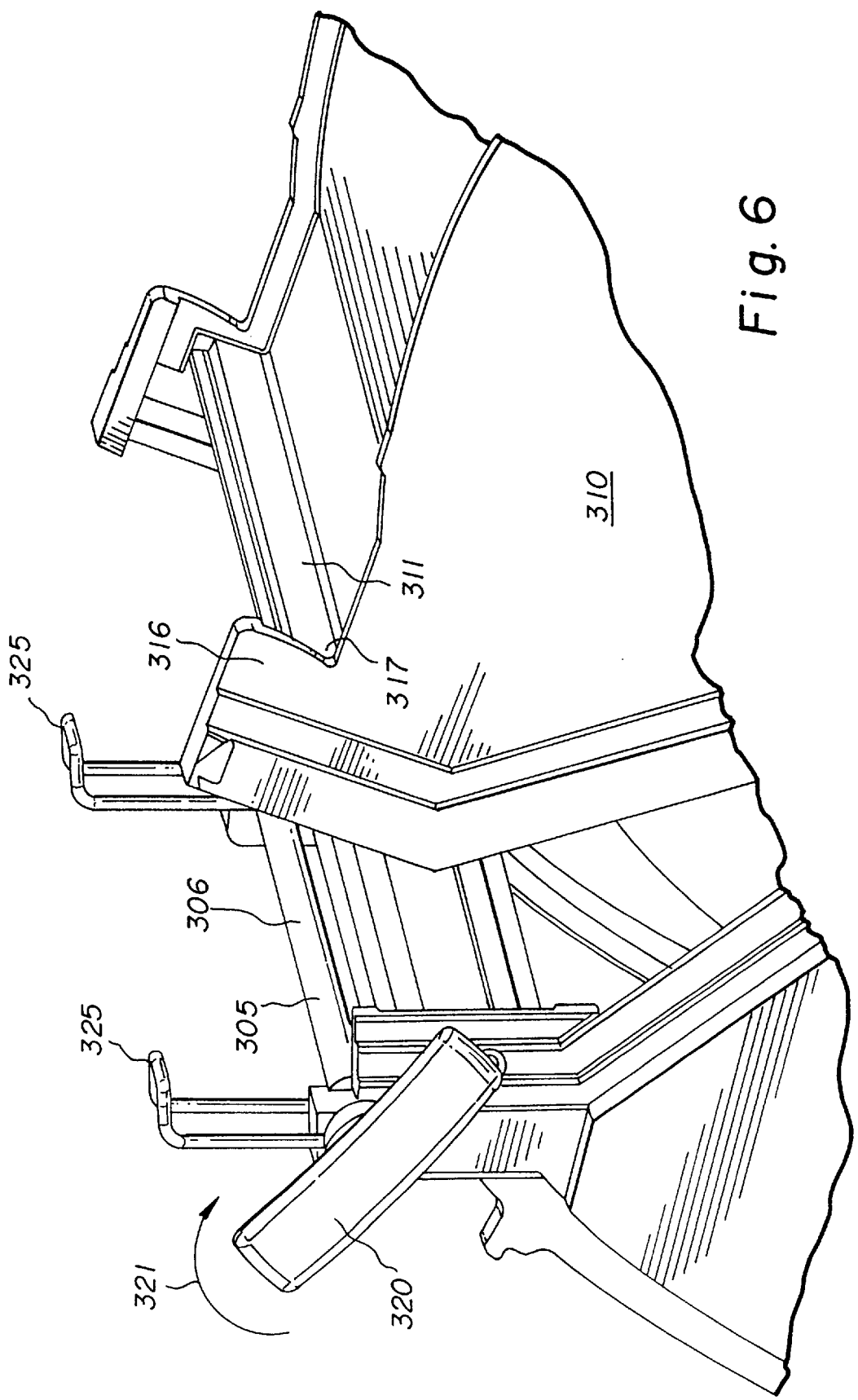
FIG. 6 is an enlarged perspective view, from the side, of the cassette of FIG. 1 showing the lock member released and the cassette partly open.

The cassette of the present invention further includes a lock assembly. The lock assembly includes two lock members in the form of clasps 325 disposed at different positions along margins 306, 312. Clasps 325 are mounted on a controller which is in the form of a rod 330 mounted on the first section 302 parallel to lips 305, 311 and axis 101, for rotation about the axis of the rod. Rod 330 is rotatably and slidably mounted within mounts 348 and 350, and has a narrow end 352 with a compression spring 354 mounted on narrow end 352 between the main portion of rod 330 and mount 348. Each clasp 325 is made of resilient, stiff wire with one end 327 firmly attached to rod 330 while the other end 326 protrudes freely through a hole 332 in rod 330. A handle 320 on the end of rod 330 allows a user to manually rotate rod 330 to move lock members between a released position as best seen in FIGS. 5 and 6, and a locked position as best seen in FIGS. 3, 4, and 7. Note that in the embodiment illustrated the handle 320 actually extends from an end in the direction of axis 101. However, handle 320 could be positioned somewhat inward away from the end of the cassette and still be considered "adjacent" such end. For example, handle 320 could be up to one-quarter of the width of the cassette, inward from an end. The useful feature here is that it is closer to one end than the other to make access easier as described below. When handle 320 is rotated to swing clasps 325 into the locked position, clasps 325 snap into place over respective protrusions 316 on second section 310. This snapping feature is aided by the shape of protrusions 316 as shown (specifically, the undercut portion 317 of each), the resilient material of clasps 325, and the fact that ends 326 of each member 325 are free to ride within respective holes 332. When clasps 325 are in the locked position, they retain lips 305, 311 and their margins 306, 312 from moving from the closed position while still allowing a photosensitive web to be withdrawn through the yielding plush material on margins 306, 312.

A handle lock is provided in the shape of locking tab 340. Locking tab 340 has an upper portion 342 which slopes at about 45 degrees toward handle 320, a lower portion which slopes slightly backward away from handle 320 at about 45 degrees to upper portion 320, and an overhang portion 346.

In operation a cassette 300 which is to serve as the dispensing cassette, receives an intercore 100 with mounted roll 21*c* through the opening defined between margins 306, 312 of the open cassette. Ends of received intercore 100 are then rotatably mounted on intercore mounts 303 so that the received intercore 100 can rotate about axis 101. This situation is best seen in FIG. 1. A leading edge of the web of roll 21*c* is then manually held near margin 306 and second section 310 rotated through the intermediate position seen in FIG. 6, to the closed position as best seen in FIGS. 3, 4, and 7. At this point clasps 325 are in their unlocked position. A user can then manually turn handle 320 in a clockwise position as viewed, for example, in FIG. 6 (that is, in the direction of arrow 321) to move the clasps from their released to locked positions engaging over respective protrusions 316. As previously mentioned, the resilient nature and mounting of clasps 325 and the shape of protrusions 316 allow clasps 325 to snap positively into their locked positions as handle 320 is rotated. At the same time, a leg 325*a* of one of clasps 325 as shown in the drawings, will be guided by portions 342 then 344 until it snaps into place under overhang portion 346. The presence of spring 354 allows for the required slight sideways movement of rod 330 and leg 325*a*. Handle 320 is then prevented from being simply turned to unlock clasps 325, as a result of leg 325*a* being caught under overhang portion 346. This feature prevents accidental unlocking and opening of the cassette without a positive act on behalf of a user. To reduce exposure of the photosensitive web, all of the foregoing steps are preferably performed in a darkroom.

A second cassette 300 is similarly prepared to act as a take-up cassette with the exception that intercore 21*c* does not carry any roll 21*c*, but instead is empty. While clasps 325 of the take-up cassette need not be moved into the locked position, they often will be to prevent the second section 310 from rotating back and forth between the open and closed positions (or part way between them) during transport of the take-up cassette. Since there is no photosensitive web roll 21*c* present, the foregoing steps can be performed under room light.

Figure 2:
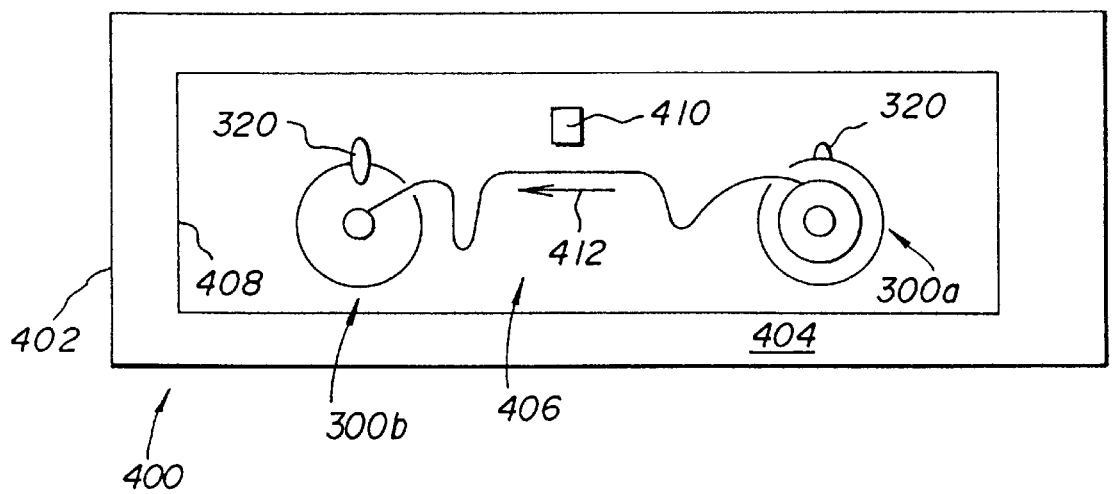
FIG. 2 is a schematic side elevation of a printer showing use of cassettes of the present invention.

At this point, both the loaded dispensing cassette 300 and the take-up cassette 300 can be mounted into a photographic printer in the manner illustrated in FIG. 2. Typically a printer 400 will have a housing of generally rectangular configuration with two opposed end walls 402 and opposed side walls 404 extending between end walls 402. A first one of the side walls 404 will have an access in the form of at least one door 406 (or one or more removable panels) which may be pivoted about a hinged end 408 between a closed and an open position, to allow access to the interior of the printer housing. When door 406 is closed, the printer housing will be essentially light tight. With door 406 opened, loaded dispensing cassette 300 is placed inside the printer housing so that its handle 320 is on the cassette end which is furthest from the first side (that is, furthest from the side on which door 406 is located). The dispensing cassette is labeled as dispensing cassette 300*a* in FIG. 2. Similarly, the take-up cassette is placed inside the printer housing so that its handle is located on the cassette end closest to the first side. The take-up cassette is labeled a cassette 300*b* in FIG. 2. Both cassettes can be retained within the printer housing by suitable restraints (not shown).

The leading edge of the web which was left protruding through the slit in the dispensing cassette 300*a*, can now be manually pulled out of dispensing cassette 300*a* and threaded by an operator past a light emitting print engine 410, to the take up cassette 300*b*. If clasps 325 of take-up cassette 300*b* were left in the locked position, an operator can use handle 320 to move them to the unlocked position. Note at this point that handle 320 is prevented from being simply turned by an operator to unlock clasps 325. In particular, the operator must pull handle 320 and rod 330 against the tension of spring 354 in order to pull leg 325*a* out from under overhang portion 346, before handle 320 can then be rotated. This feature not only prevents accidental opening of a loaded cassette, but requires an operator to positively think about whether this is the right cassette to be opened (that is, it reduces the chance of an operator opening the loaded dispensing cassette accidentally instead). Take up cassette 300*b* can then be opened, and the web lead end attached by the operator to the empty intercore rotatably mounted within take-up cassette 300*b*. Door 406 can then be closed and the drive mechanism of the printer can cause the photosensitive web to be fed from dispensing cassette 300*a*, past print engine 410, and rolled up onto intercore 100 in take-up cassette 300*b*. Print engine 410 can print images either optically using film negatives, for example, or from stored digital images (in which case print engine 410 can be a CRT, laser, or LED printer, for example).

When all of web 21*c* has been transferred from the dispensing cassette 300*a* to the take-up cassette 300*b*, an operator can open door 406 and turn handle 320 of take-up cassette 300*b* to place clasps 325 in the locked position (if not done earlier by the operator after threading of the web, but before commencing exposure). Both dispensing cassette 300*a* and take-up cassette 300*b* can them be removed through the first side of printer 400 (specifically, through open door 406). Dispensing cassette 300*a* may then be reloaded (or used as is, by repositioning within the printer so as to be used as a take-up cassette), while take-up cassette 300*b* will be transported to a developer at which the exposed latent images can be chemically developed to yield fixed permanent images on the web.

It will be appreciated that during the foregoing operation, the operator is able to unlock and lock clasps 325 on take-up cassette simply by pulling and turning the readily accessible handle 320. Although there are multiple points (specifically, two) at which mating margins 306, 312 are urged together by clasps 325, it is not necessary for the operator to reach inside printer 400 to reach clasps or other locking mechanisms which may be remote from the first side of printer 400 (that is, remote from the door side). Furthermore, it is difficult for an operator to inadvertently try to open dispensing cassette 300*a* rather than take-up cassette 300*b*, since handle 320 of dispensing cassette is remote from the first side of the printer and difficult for the operator to reach. Thus, the simple locking assembly provided on the cassette both provides easy access to control multiple locking members, while reducing the chance that an operator will inadvertently open a dispensing cassette 300a.

The invention has been described in detail with particular reference to certain preferred embodiments thereof, but it will be understood that variations and modifications can be effected within the spirit and scope of the invention.

What is claimed is:

1. A cassette which can receive and rotatably mount a roll of photosensitive medium web, comprising:
    (a) a housing having a first section and a second section with respective, mating margins extending in a transverse direction between opposite ends of the cassette, the second section being movable with respect to the first section between a closed position of the cassette in which the margins abut one another so that the housing is maintained light tight, and an open position of the cassette in which the margins are spaced apart, and which margins can define between them a slit through which the web of photosensitive medium can pass;
    (b) a lock assembly having:
        at least one lock member movable between a locked position in which it restrains the second section from moving from the closed position, and a released position in which the cassette can be opened;
        a handle adjacent a first end of the cassette connected to the at least one lock member so that the at least one lock member can be moved between the locked and released positions by manual movement of the handle; and
    (c) spaced apart intercore mounts within the housing to rotatably receive opposite ends of an elongated intercore on which the roll is mounted and define a rotational axis of a received intercore, and wherein when the second section is in the open position the mounted roll and intercore can be received into, or removed from, the cassette through a gap between the margins;
    wherein the second section is movable with respect to the first section between the closed and open positions, by rotation about the intercore rotational axis.

2. A cassette which can receive and rotatably mount a roll of photosensitive medium web, comprising:
    (a) a housing having a first section and a second section with respective, mating margins extending in a transverse direction between opposite ends of the cassette, the second section being movable with respect to the first section between a closed position of the cassette in which the margins abut one another so that the housing is maintained light tight, and an open position of the cassette in which the margins are spaced apart, and which margins can define between them a slit through which the web of photosensitive medium can pass;
    (b) a lock assembly having:
        at least two lock members disposed at different positions along the margins and each movable between a locked position in which it restrains the margins from moving from the closed position, and a released position;
        a handle adjacent a first end of the cassette; and
        a controller connected between the handle and the at least two lock members so that the at least two lock members can be moved between locked and released positions by manual movement of the handle.

3. A cassette according to claim 2 additionally comprising spaced apart intercore mounts within the housing to rotatably receive opposite ends of an elongated intercore on which the roll is mounted and define a rotational axis of a received intercore, and wherein when the second section is in the open position the mounted roll and intercore can be received into, or removed from, the cassette through a gap between the margins.

4. A cassette according to claim 3 wherein the intercore mounts are spaced apart in the transverse direction.

5. A cassette according to claim 2 wherein the lock assembly is mounted on one of the housing sections such that the lock members, when in the locked position, engage respective portions of the other housing member.

6. A cassette according to claim 4 wherein:
    the other housing member has a set of protrusions; and
    the lock members are resilient and dimensioned to snap over respective protrusions when the second section is in the closed position and the lock members are moved to the locked position.

7. A cassette according to claim 6 wherein the controller is a rod extending in the transverse direction on the housing and which is rotated by the handle, and wherein the lock member are clasps which extend radially outward from the rod and snap over respective protrusions as the rod is rotated.

8. A cassette according to claim 7 additionally comprising a handle lock which prevents rotation of the rod when the lock members are in the locked position until the handle is pulled out or pushed in.

9. A cassette according to claim 3 wherein the second section is movable with respect to the first section between the closed and open positions, by rotation about the intercore rotational axis.

10. A cassette according to claim 2 additionally comprising an intercore with opposite ends rotatably received in respective intercore mounts.

11. A cassette according to claim 10 additionally comprising a roll of photosensitive medium web mounted on the intercore.

12. A method of dispensing a photosensitive medium web, comprising dispensing the web through the slit of a cassette according to claim 2, from a roll of photosensitive web material rotatably mounted within the cassette housing.

13. A method of taking up a photosensitive medium web, comprising receiving the web through the slit of a cassette according to claim 2 and winding it onto an intercore rotatably mounted within the cassette.

14. A method of exposing a photosensitive medium web in a printer having a housing, a light emitting print engine within the housing, and having at least one access which allows access to an interior of the housing through a first side of the printer housing, comprising:
    (a) dispensing the web through a slit of a first cassette from a roll of photosensitive web material rotatably mounted within the first cassette, wherein the first cassette includes a first handle associated with a first lock member, the first handle being oriented such that it is adjacent an end of the first cassette which is furthest from the first side of the printer housing;
    (b) feeding the web past the print engine;
    (c) exposing at least a portion of the web at the print engine; and
    (d) receiving the exposed web through a slit of a second cassette and winding it onto an intercore rotatably mounted within the second cassette, wherein the second cassette includes a second handle associated with a second lock member, the second handle being oriented such that it is on an end of the second cassette which is closest to the first side of the printer housing.

15. A method according to claim 14 additionally comprising at the second cassette, prior to exposing the web at the print engine:

moving the second handle to release the second lock member;

opening the second cassette; and threading an end of the web onto an intercore rotatably mounted within the second cassette.

16. A method according to claim 14 wherein photographic images are exposed onto the web from the print engine.

* * * * *